United States Patent
Sakairi et al.

(10) Patent No.: US 10,908,444 B2
(45) Date of Patent: Feb. 2, 2021

(54) DISPLAY DEVICE, METHOD FOR PRODUCING DISPLAY DEVICE, AND DISPLAY APPARATUS OF PROJECTION TYPE

(71) Applicant: SONY CORPORATION, Tokyo (JP)

(72) Inventors: Takashi Sakairi, Kanagawa (JP); Koichi Amari, Kanagawa (JP); Chiho Araki, Nagasaki (JP); Hitori Tanigawa, Nagasaki (JP); Katsumi Kouno, Nagasaki (JP); Keiichi Maeda, Kanagawa (JP); Takayoshi Masaki, Nagasaki (JP); Seiya Haraguchi, Nagasaki (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/563,429

(22) PCT Filed: Feb. 19, 2016

(86) PCT No.: PCT/JP2016/054923
§ 371 (c)(1),
(2) Date: Sep. 29, 2017

(87) PCT Pub. No.: WO2016/163165
PCT Pub. Date: Oct. 13, 2016

(65) Prior Publication Data
US 2018/0088396 A1    Mar. 29, 2018

(30) Foreign Application Priority Data
Apr. 10, 2015 (JP) ................ 2015-080589

(51) Int. Cl.
G02F 1/1333 (2006.01)
G02F 1/1368 (2006.01)
(Continued)

(52) U.S. Cl.
CPC ...... G02F 1/133345 (2013.01); G02F 1/1368 (2013.01); G02F 1/13439 (2013.01);
(Continued)

(58) Field of Classification Search
CPC ... G02F 1/133345; G02F 2001/134372; G02F 1/134363
See application file for complete search history.

(56) References Cited

U.S. PATENT DOCUMENTS 5,610,737 A * 3/1997 Akiyama .............. H01L 29/458
257/57
8,947,337 B2 * 2/2015 Kimura ............... G02F 1/13624
345/100
(Continued)

FOREIGN PATENT DOCUMENTS

JP       04-251285 A    9/1992
JP    2009-175493 A    8/2009
JP    2011-221158 A   11/2011

OTHER PUBLICATIONS

International Search Report and Written Opinion of PCT Application No. PCT/JP2016/054923, dated Apr. 26, 2016, 9 pages of ISRWO.
(Continued)

Primary Examiner — Lucy P Chien
(74) Attorney, Agent, or Firm — Chip Law Group

(57) ABSTRACT

[Object]
To provide a display device, a method for producing a display device, and a display apparatus of projection type, which are capable of suppressing deterioration of image quality attributable to a depressed space between pixel electrodes.
[Solving Means]
A display device of the present disclosure includes pixel electrodes formed for individual pixels and an insulating
(Continued)

film for insulation between the pixel electrodes. The insulating film is so formed as to protrude from an electrode surface between the pixel electrodes. A display apparatus of projection type of the present disclosure uses the display device of the present disclosure as a light modulator to module light from a light source. A method for producing a display device of the present disclosure having pixel electrodes formed for individual pixels and an insulating film for insulation between the pixel electrodes includes forming the insulating film as to protrude between the pixel electrodes.

11 Claims, 10 Drawing Sheets

(51) Int. Cl.
  *G02F 1/1335*    (2006.01)
  *G02F 1/1343*    (2006.01)
  *G03B 33/12*     (2006.01)
  *G03B 33/08*     (2006.01)
  *G03B 21/00*     (2006.01)

(52) U.S. Cl.
  CPC .. *G02F 1/133553* (2013.01); *G02F 1/134309* (2013.01); *G02F 2001/133357* (2013.01); *G02F 2201/123* (2013.01); *G03B 21/006* (2013.01); *G03B 33/08* (2013.01); *G03B 33/12* (2013.01)

(56) References Cited

U.S. PATENT DOCUMENTS

| | | | | |
|---|---|---|---|---|
| 2006/0176412 | A1* | 8/2006 | Yasukawa | G02F 1/133553 349/38 |
| 2012/0307343 | A1* | 12/2012 | Lai | G02F 1/167 359/296 |
| 2013/0235294 | A1* | 9/2013 | Nomura | G02F 1/1339 349/43 |
| 2014/0160385 | A1* | 6/2014 | Yamazaki | G02F 1/13454 349/42 |
| 2016/0211478 | A1* | 7/2016 | Nirengi | H01L 51/5228 |
| 2016/0363821 | A1* | 12/2016 | Lee | G02F 1/134309 |
| 2016/0370648 | A1* | 12/2016 | Yao | G02F 1/1335 |

OTHER PUBLICATIONS

Office Action of JP Patent Application No. 2016-059916, dated Oct. 29, 2019, 6 pages of Office Action and 05 English Translation.

* cited by examiner (STEP 5)

(STEP 6)

(STEP 7)

(STEP 8)

(STEP 9)

DISPLAY DEVICE, METHOD FOR PRODUCING DISPLAY DEVICE, AND DISPLAY APPARATUS OF PROJECTION TYPE

CROSS REFERENCE TO RELATED APPLICATIONS

This application is a U.S. National Phase of International Patent Application No. PCT/JP2016/054923 filed on Feb. 19, 2016, which claims priority benefit of Japanese Patent Application No. JP 2015-080589 filed in the Japan Patent Office on Apr. 10, 2015. Each of the above-referenced applications is hereby incorporated herein by reference in its entirety.

TECHNICAL FIELD

The present disclosure relates to a display device, a method for producing a display device, and a display apparatus of projection type.

BACKGROUND ART

A material such as aluminum (Al) which has a high degree of reflection is often used as a material for pixel electrodes in order to collect light more efficiently for display devices such as liquid crystal display device of reflection type. Such Al-based pixel electrodes are prepared by forming an Al film by sputtering, patterning the Al film by photolithography (which includes resist coating and ensuing sensitization), and dry etching. The foregoing method, however, has a disadvantage of resulting in a difference in level between the part on which the pixel electrode is formed and the space which divides the pixel electrodes. The difference in level is attributable to the thickness of the Al film and the corrosion of the underlying film subject to overetching.

In the case of liquid crystal display device of reflection type, pixel electrodes are coated with a dielectric film of silicon oxide (SiO) or silicon nitride (SiN) for their voltage driving. Coating with a dielectric film is hampered by the difference in level that occurs at the space between pixel electrodes. The resulting dielectric film causes the alignment film formed thereon to have uncoated areas. Such uncoated areas cause the liquid crystal molecules to partly remain unoriented when the liquid crystal is brought into action. Moreover, such unoriented areas often vary from one pixel to another; this unevenness causes the individual pixels to vary in reflectance, which leads to deteriorated image quality (or rough image appearance).

In order to overcome the foregoing disadvantage, a new method has been proposed which includes forming a stopper film of silicon nitride on the previously formed pixel electrodes and performing planarization (by chemical mechanical polishing (CMP)) and etch back, thereby preventing the space between pixel electrodes from getting recessed (see Patent Document 1, for example).

PRIOR ART DOCUMENT

Patent Document

[Patent Document 1]
JP 2009-175493 A

SUMMARY OF THE INVENTION

Problems to be Solved by the Invention

The conventional technology disclosed in Patent Document 1, however, suffers the drawback that there occurs an area where the film of silicon nitride is not formed between pixel electrodes in the case where the gap between the pixel electrodes (the width of space between pixel electrodes) is narrowed (reduced). Another drawback is that there occurs a recess (depressed space) adjacent to the pixel electrode because the silicon nitride adjacent to the pixel electrode also undergoes etching at the time of etch back.

It is an object of the present disclosure to provide a display device, a method for producing a display device, and a display apparatus of projection type, which are capable of suppressing the deterioration of image quality attributable to the depressed space between the pixel electrodes.

Means for Solving the Problems

The present disclosure to achieve the foregoing object is concerned with a display device which includes pixel electrodes formed for individual pixels and an insulating film for insulation between the pixel electrodes, the insulating film being so formed as to protrude from an electrode surface between the pixel electrodes.

The present disclosure to achieve the foregoing object is also concerned with a method for producing a display device including pixel electrodes formed for individual pixels and an insulating film for insulation between the pixel electrodes, the method including forming the insulating film so as to protrude from an electrode surface between the pixel electrodes.

The present disclosure to achieve the foregoing object is also concerned with a display apparatus of projection type including a light source, a light modulator to modulate light from the light source, and a projector to project the light which has undergone modulation by the light modulator, the light modulator including pixel electrodes formed for individual pixels and an insulating film for insulation between the pixel electrodes, the insulating film being so formed as to protrude from an electrode surface between the pixel electrodes.

The foregoing display device, the method for producing a display device, and the display apparatus of projection type, in which the insulating film for insulation between the pixel electrodes is so formed as to protrude from the electrode surface between the pixel electrodes, offer an advantage that an alignment film is free of void areas unlike the case in which the space between the pixel electrodes assumes a recessed shape when the alignment film is formed on the insulating film. This offers an advantage that there will not occur any unoriented area in liquid crystal at the time of activation of the liquid crystal, and hence there is no possibility of the light reflectance partially decreasing. The result is that the image quality is saved from rough appearance due to fluctuation in reflectance among individual pixels.

Effect of the Invention

The present disclosure offers the advantage that the image quality is saved from rough appearance due to the fluctuation in reflectance among individual pixels that occurs as the result of the space getting depressed between pixel electrodes. Accordingly, the present disclosure may suppress the deterioration of the image quality due to the depressed space between the pixel electrodes.

The effect of the present disclosure is not necessarily restricted to the one just mentioned above. It may include additional ones to be mentioned herein. Moreover, the effects mentioned herein are merely illustrative and are not intended to restrict the scope of the present disclosure. Any additional effects may be included therein.

MODES FOR CARRYING OUT THE INVENTION

Figure 1:
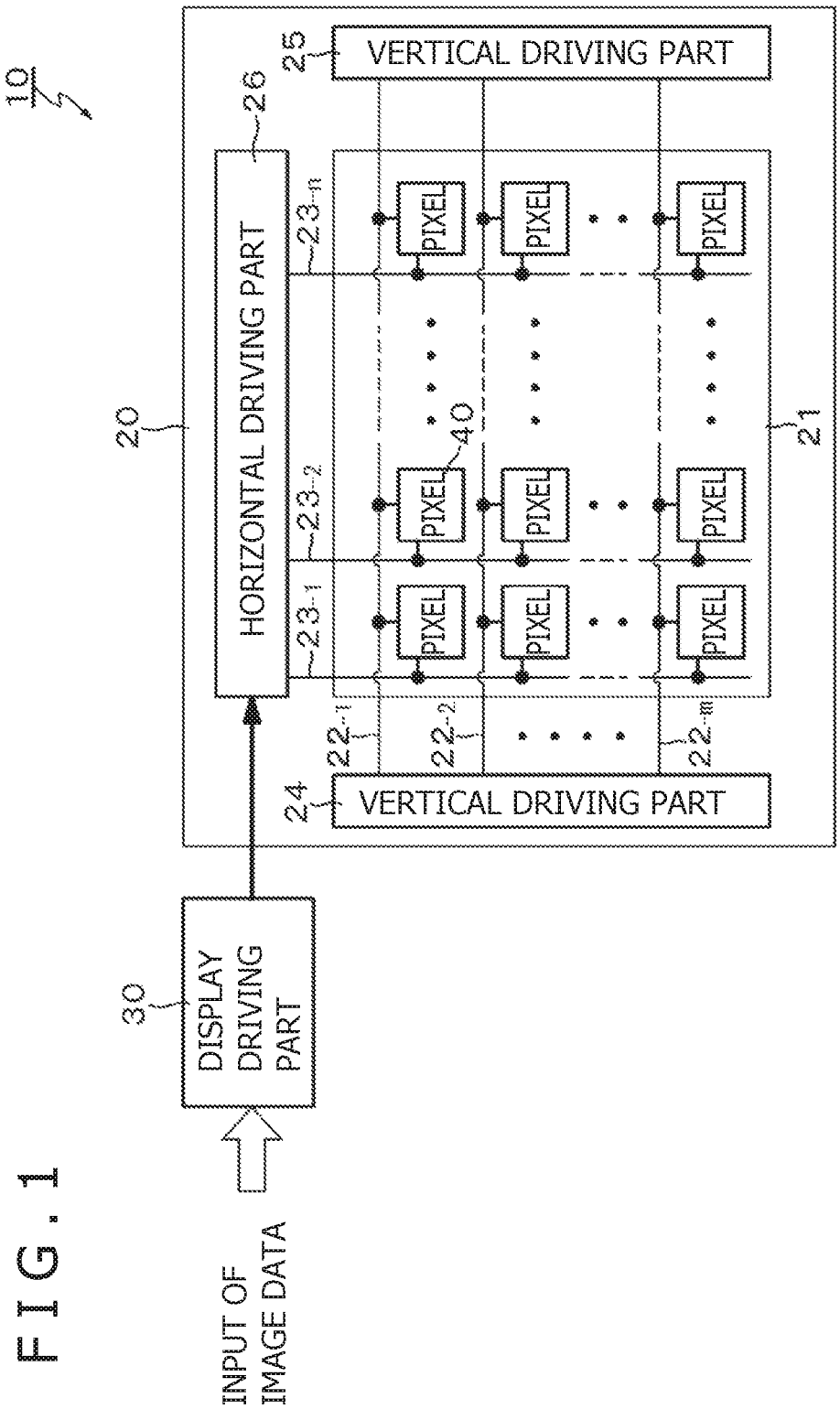
FIG. 1 is a schematic diagram depicting the system structure of the liquid crystal display device to which is applied the present disclosure.

A detailed description of modes for implementing the technique of the present disclosure (hereinafter referred to as "embodiments") will be given below with reference to the accompanying drawings. These embodiments are merely illustrative for values and materials and are not intended to restrict the scope of the technique of the present disclosure. In what follows, identical elements or elements with identical functions are identified by identical symbols, with their description not repeated. Incidentally, the description below proceeds in the following sequence.

1. General description of display device, method for producing display device, and display apparatus of projection type of present disclosure 2. Display device to which is applied technology of present disclosure
   2-1. System structure
   2-2. Pixel circuit
   2-3. Panel structure of liquid crystal display device of reflection type
   2-4. Basic pixel structure
   2-5. Problems involved in conventional pixel structure 3. One embodiment of present disclosure
   3-1. Pixel structure pertaining to embodiment
   3-2. Method for producing pixel structure pertaining to embodiment 4. Display apparatus of projection type
   4-1. Three-panel display apparatus of projection type
   4-2. Single-panel display apparatus of projection type <General Description of Display Device, Method for Producing Display Device, and Display Apparatus of Projection Type of Present Disclosure>

The display device, the method for producing the display device, and the display apparatus of projection type of the present disclosure may be configured such that a protruding part of an insulating film held between pixel electrodes has an inclined surface that widens downward from a center between the pixel electrodes to edges of the pixel electrodes. The protruding part should preferably be formed closer to the center between the pixel electrodes than to an edge surface of the pixel electrode. In addition, the protruding part should preferably be formed with a height low enough not to alter the thickness of the insulating film on the pixel electrode.

The display device, the method for producing the display device, and the display apparatus of projection type of the present disclosure including the preferred configuration described above may be configured such that the insulating film is a dielectric film of silicon nitride and the pixel electrode is a reflective electrode.

Also, the method for producing the display device of the present disclosure including the preferred configuration described above may be configured such that the protruding part of the insulating film held between the pixel electrodes has an inclined surface that widens downward from the center between the pixel electrodes to the edges of the pixel electrode. In addition, the process may be modified such that an interlayer film assuming a protruding shape is formed between the pixel electrodes and then an insulating film is formed by high-density plasma on the interlayer film assuming a protruding shape.

<Display Device to which is Applied Technology of Present Disclosure>

The display device to which is applied the technology of the present disclosure has a system configuration as depicted in FIG. 1 which is a schematic block diagram. The depicted display device is a liquid crystal display device of active matrix type which displays images through light modulation induced by liquid crystal (which is an organic substance including polarizable molecules).

[System Structure]

As depicted in FIG. 1, a display device of active matrix type 10 according to the embodiment includes a display panel (liquid crystal panel) 20 to display images and a display driving member 30 to drive the display panel 20.

Figure 3A:
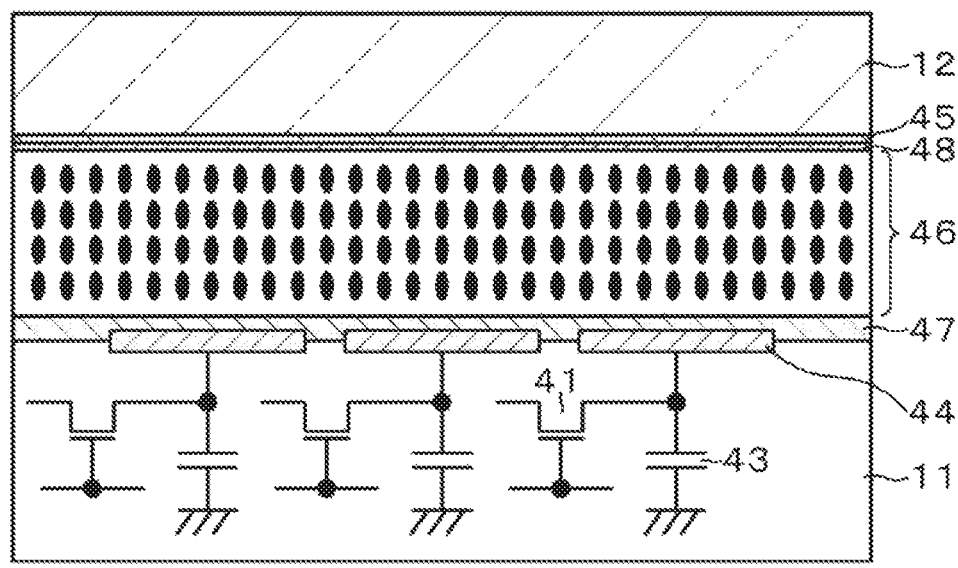
FIG. 3A is a sectional view depicting one example of the panel structure of the liquid crystal display device of reflection type and FIG. 3B is a sectional view depicting one example of the basic pixel structure of a unit pixel.

The display panel 20 includes a first substrate 11 and a second substrate 12, at least either of which is a transparent insulating substrate, facing each other a certain distance apart, with the space between them filled with a liquid crystal material (see FIG. 3A). On the first substrate 11 is formed a pixel array 21, which includes unit pixels (occasionally referred to simply as "pixels" hereinafter) 40 two-dimensionally arranged in a matrix.

The pixel array 21, on which pixels are arranged to form m rows and n columns, has scanning lines 22 ($22_{-1}$ to $22_{-m}$) connected to pixels on each row and signal lines 23 ($23_{-1}$ to $23_{-m}$) connected to pixels on each column. On the display panel (or the first glass substrate) 20 are mounted, in addition to the pixel array 21, peripheral driving circuits, such as two vertical drive units 24 and 25 and a horizontal drive unit 26.

The vertical drive units 24 and 25 are arranged on the right and left sides, with the pixel array 21 held between them. Although the example depicted here is constructed such that the vertical drive units 24 and 25 are arranged on the right and left sides of the pixel array 21, the structure may be modified such that only one of the vertical drive units 24 and 25 is arranged on the right or left side of the pixel array 21.

The vertical drive units 24 and 25 include shift registers and buffer circuits, or the like. They sequentially scan the individual pixel rows on the pixel array 21, thereby selecting pixels 40 row by row. The horizontal drive unit 26 includes shift registers, sampling circuits, and buffer circuits, or the like, for example. It writes image data, received from the external display driving unit 30, pixel by pixel sequentially into individual pixels 40 in the pixel row selected by the vertical drive units 24 and 25.

[Pixel Circuit]

Figure 2A:
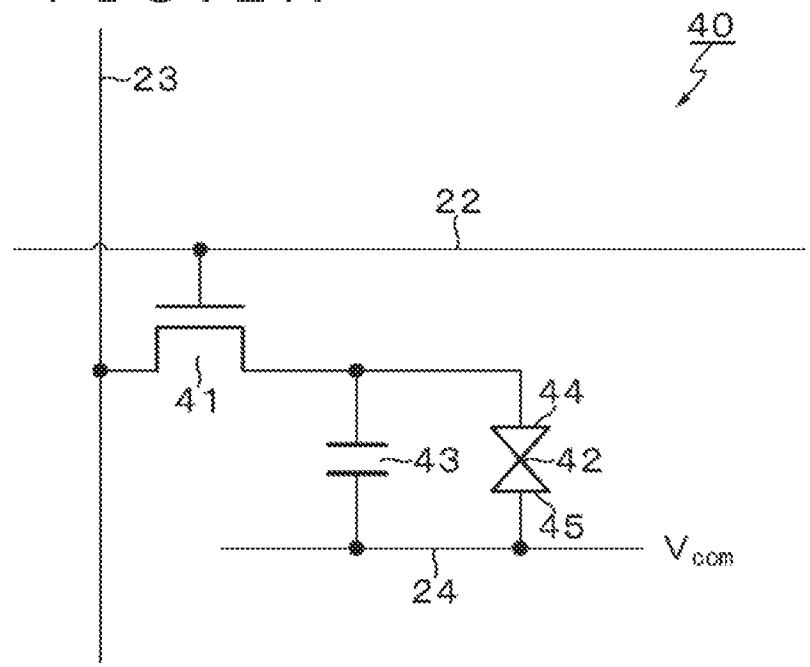
FIG. 2A is a circuit diagram depicting one example of the circuit structure of the unit pixel and FIG. 2B is a waveform diagram depicting the driving action of liquid crystal which is involved in frame-reversal drive scheme.

FIG. 2A is a circuit diagram depicting one example of a circuit structure of the unit pixel 40. As illustrated in FIG. 2A, it is understood from the circuit diagram that the pixel 40 includes a pixel transistor 41, a liquid crystal capacitance 42, which has a pixel electrode connected to a drain electrode of the pixel transistor 41, and a storage capacitance 43, which has one electrode thereof connected to a drain electrode of the TFT 41. The liquid crystal capacitance 42 is defined as the capacitance that occurs between the pixel electrode 44 and a counter electrode 45 thereof. The pixel transistor 41 is a thin film transistor (TFT) of N-channel type, for example.

The pixel transistor 41 has its gate electrode connected to a scanning line 22 and its source electrode connected to a signal line 23. The liquid crystal capacitance 42 has its counter electrode 45 connected to a common line 24, and the storage capacitance 43 has another electrode connected to the common line 24, in the same way for all the pixels. Also, the counter electrode 45 of the liquid crystal capacitance 42 and the other electrode of the storage capacitance 43 are given the common voltage (counter electrode voltage) $V_{com}$ through the common line 24, in the same way for all the pixels.

Figure 2B:
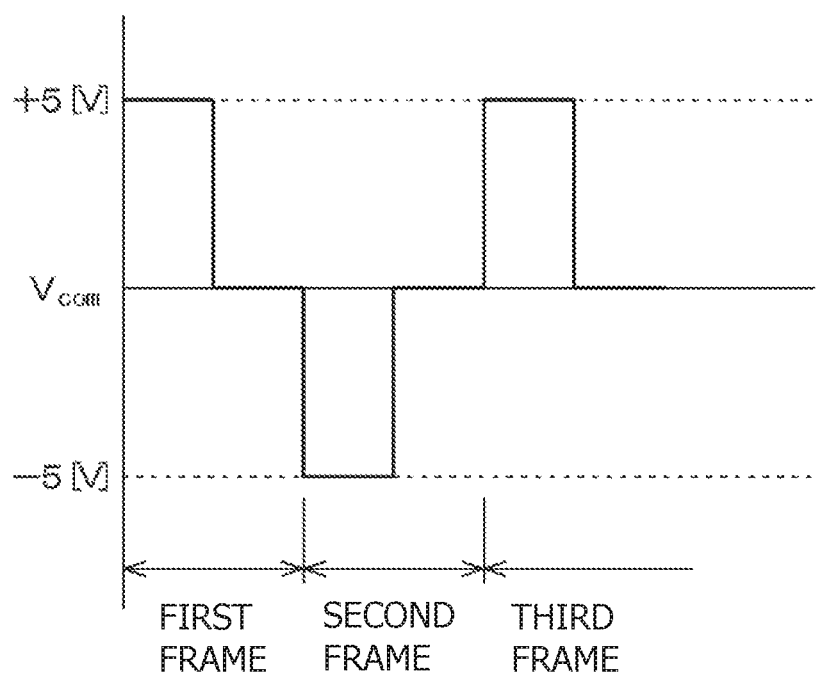

The liquid crystal display device of active matrix type 10 relies on an alternate current (AC) driving scheme which periodically reverses the polarity of display signals with reference to the common voltage $V_{com}$, as depicted in FIG. 2B. The AC driving scheme effectively prevents the liquid crystal from deterioration that occurs when the liquid crystal is continuously given a direct current (DC) voltage with invariable polarity and also prevents the alignment film from image burn. The AC driving scheme employed in the illustrated example reverses the polarity of display signals in synchronism with the frame cycle.

The pixel electrode 44 may be of either transmission type or reflection type. The former permits the light from a back light, or a light source placed behind an image plane, to pass through. The latter reflects external light which is used as the light source. In the case where the pixel electrode 44 is of transmission type, the liquid crystal display device 10 mentioned herein is of transmission type. In the case where the pixel electrode 44 is of reflection type, the liquid crystal display device 10 mentioned herein is of reflection type.

The following description focuses on the liquid crystal display device of reflection type in which the pixel electrode 44 is an electrode of reflection type (light reflection type).

[Panel Structure of Liquid Crystal Display Device of Reflection Type]

The liquid crystal display device of reflection type has the display panel (or liquid crystal panel) 20 constructed in the way as explained below with reference to FIG. 3A. FIG. 3A is a sectional view illustrating one example of the structure of the panel in the liquid crystal display device of reflection type.

It is to be noted from FIG. 3A that the panel in the liquid crystal display device of reflection type has the first substrate 11 (e.g., silicon substrate) and the second substrate 12 (e.g., glass substrate). The first substrate 11 (or silicon substrate) has the pixel circuit including the pixel transistor 41 and the storage capacitance 43 as depicted in FIG. 2A.

There are also depicted the pixel electrode 44, which is a reflective electrode of aluminum or the like, and the counter electrode 45, which is a transparent electrode of indium tin oxide (ITO). The space between the pixel electrode 44 and the counter electrode 45 is filled with liquid crystal. This liquid crystal forms a normally black liquid crystal layer 46 with vertical orientation. Also, between the pixel electrode 44 and the liquid crystal layer 46 is arranged an alignment film 47, and between the counter electrode 45 and the liquid crystal layer 46 is arranged an alignment film 48.

[Basic Pixel Structure]

Figure 3B:
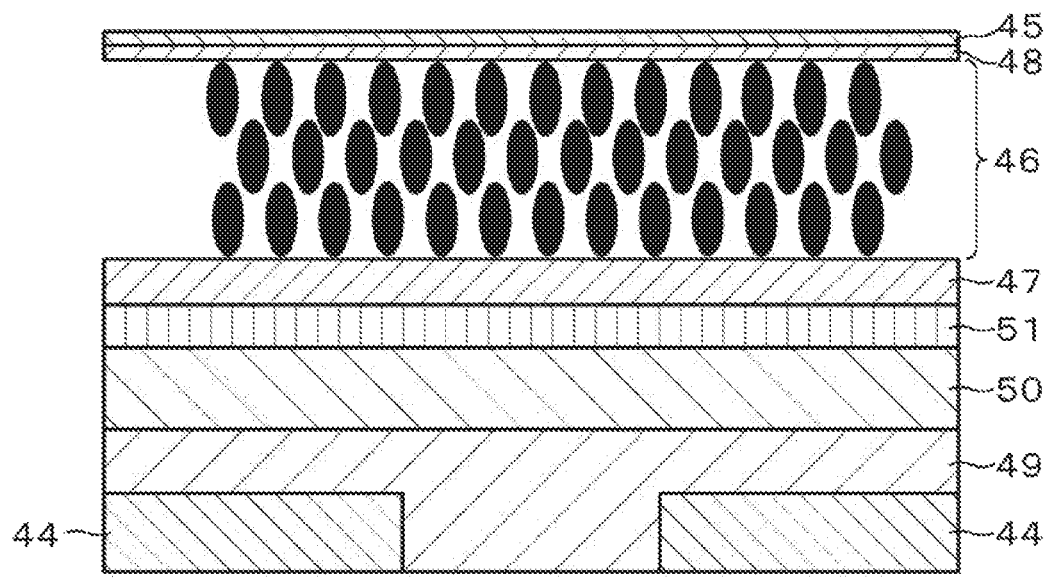

The unit pixel 40 has a basic pixel structure as illustrated in FIG. 3B. FIG. 3B is a sectional view depicting one example of the basic pixel structure of a unit pixel 40.

In the pixel structure depicted in FIG. 3B, a dielectric film 50 for voltage driving is formed above the pixel electrode 44 and between the pixel electrodes 44, with an interlayer film 49 formed thereunder. The dielectric film 50 is entirely covered with the alignment film 47, with an interlayer film 51 interposed between them.

The pixel structure mentioned above should ideally be free of a difference in level between an upper surface of the pixel electrode 44 and the space between the pixel electrodes 44. The absence of such a difference in level between the upper surface of the pixel electrode 44 and the space between the pixel electrodes 44 permits the alignment film 47 to be formed uniformly and the dielectric film 50 to have a uniform thickness above the pixel electrode 44.

[Problems Involved in Conventional Pixel Structure]

The liquid crystal display device of reflection type usually has the pixel electrode 44 made of a high reflectance material such as aluminum (Al), which may be occasionally replaced by silver (Ag). The pixel electrode of aluminum is formed by sputtering, patterning by lithography for resist coating and sensitization, and dry etching. These steps result in a difference in level between that part which becomes the pixel electrode 44 and the space between the pixel electrodes 44. This difference in level is attributable to the thickness of the aluminum and the overetching that causes corrosion to an underlying film.

Figure 4A:
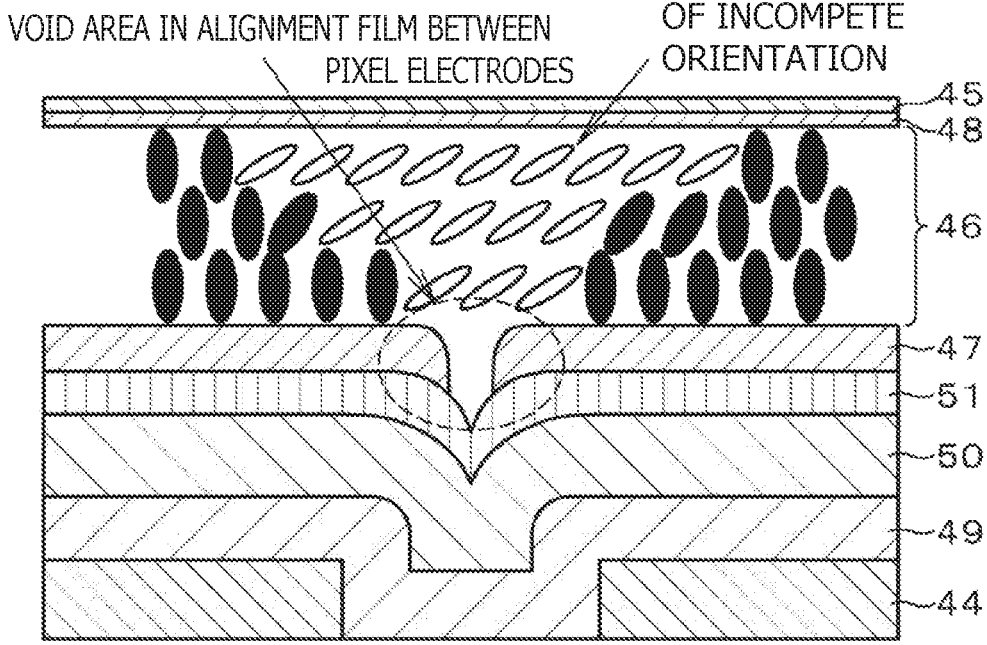
FIG. 4A is a sectional view depicting the state that appears when void areas occur in the alignment film between the pixel electrodes.
Figure 4B:
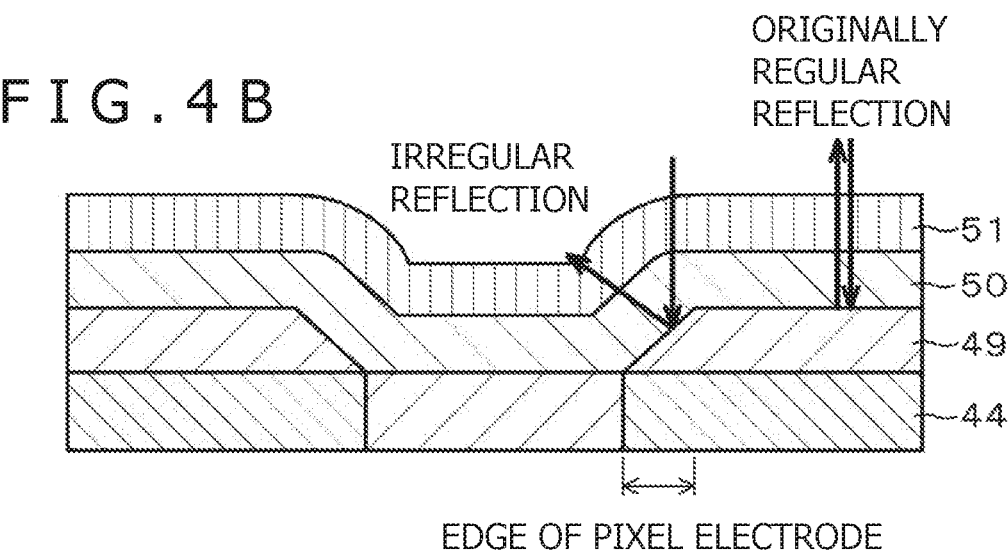
FIG. 4B is a schematic diagram depicting how reflectance decreases due to variation in the thickness of the dielectric film.
Figure 4C:
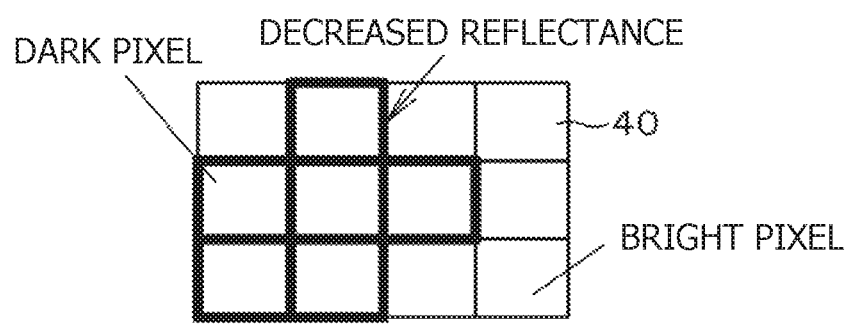
FIG. 4C is a schematic diagram depicting how dark pixels and bright pixels occur randomly when the reflectance partially decreases.

The lowered space between the pixel electrodes 44 leads to a problem with the alignment film 47 to be formed on the dielectric film 50. That is, the resulting alignment film 47 is not complete and leaves some uncoated (void) areas on the dielectric film 50 as depicted in FIG. 4A. Such uncoated areas cause the liquid crystal to remain partly unoriented during its driving. This, in turn, aggravates the responsiveness of the liquid crystal and hence partly decreases the reflectance of light. To be more specific, the dielectric film 50 varies in thickness at the edge of the pixel electrode 44 and this causes the light, which should originally undergo regular reflection, undergoes irregular reflection, as depicted in FIG. 4B. This results in a partial decrease in reflectance. The occurrence of the unoriented areas in the alignment film 47 is not uniform but varies from one pixel 40 to another. As the result, the pixels 40 vary in light reflectance from one to another, which causes bright pixels and dark pixels to occur randomly, leading to deteriorated image quality with rough appearance, as depicted in FIG. 4C.

One Embodiment of Present Disclosure

One embodiment of the present disclosure is intended to overcome the disadvantage of the conventional pixel structure which suffers from the deterioration of image quality due to rough appearance which is caused by variation in light reflectance among pixels 40 because space between the pixel electrodes 44 becomes depressed. The embodiment of the present disclosure will be described below with reference to FIG. 5A, which is a sectional view depicting the pixel structure pertaining to the embodiment of the present disclosure.

[Pixel Structure Pertaining to Embodiment]

Figure 5A:
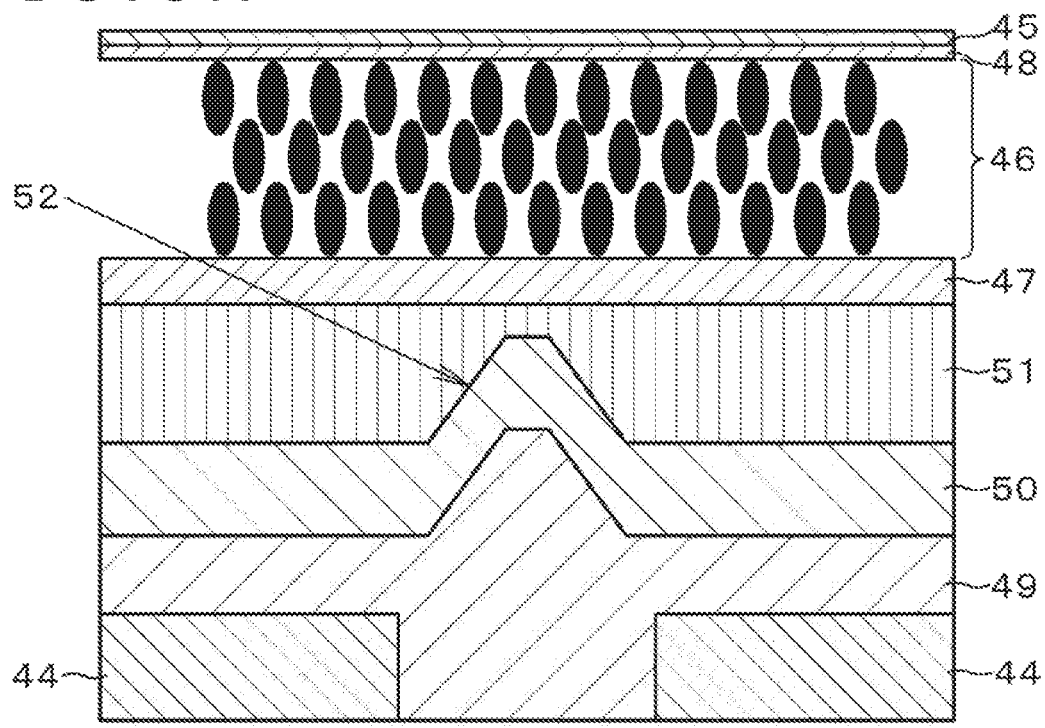
FIG. 5A is a sectional view depicting the pixel structure pertaining to one embodiment of the present disclosure and FIG. 5B is a detailed sectional view depicting the projected part of the dielectric film.

It is depicted in FIG. 5A that the dielectric film 50 is formed above the pixel electrode 44 and between the pixel electrodes 44, with the interlayer film 49 formed thereunder. The interlayer film 49 is a film of silicon oxide (SiO) or the like, and the dielectric film 50 is a film of silicon nitride (SiN) or the like. The dielectric film 50 functions as an insulating film to insulate the pixel electrodes 44 from each other. The dielectric film 50 also performs voltage driving.

The dielectric film 50 is covered with the alignment film 47, with the interlayer film 51 placed thereunder, over the entire surface of the substrate. There exists a gap between the alignment film 47 adjacent to the pixel electrode 44 and the alignment film 48 adjacent to the counter electrode 45, and this gap is filled with a liquid crystal material, so that the liquid crystal layer 46 is formed. The embodiment described herein is characterized in that the dielectric film 50, which is one kind of insulating film, is so formed as to protrude from the surface of the electrode between the pixel electrodes 44.

Figure 5B:
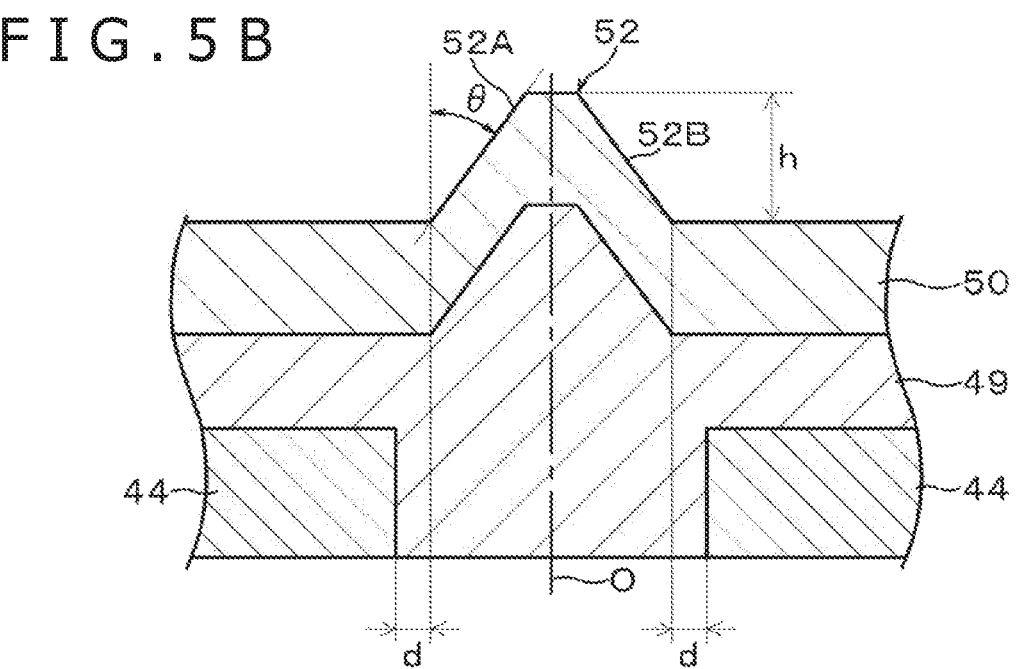

A protruding part 52 between the pixel electrodes 44 of the dielectric film 50 (hereinafter simply referred to as "protruding part 52 of the dielectric film 50") will be explained in more detail with reference to FIG. 5B. FIG. 5B is a sectional view for explaining the protruding part 52 of the dielectric film 50 in more detail.

It is noted from FIG. 5B that the protruding part 52 of the dielectric film 50 has inclined surfaces 52A and 52B which extend at a prescribed angle θ from a center O between the pixel electrodes 44 toward the edges of the pixel electrodes 44. Moreover, the protruding part 52 of the dielectric film 50 exists outside the edge surfaces of the pixel electrodes 44, or it is formed near the center O between the pixel electrodes 44 and away from the edge surfaces of the pixel electrodes 44. To be more specific, the protruding part 52 of the dielectric film 50 is formed such that lower ends of the inclined surfaces 52A and 52B are positioned close to the center O by a distance d away from the edge surfaces of the pixel electrodes 44. In addition, the protruding part 52 of the dielectric film 50 should preferably have its top flattened.

The protruding part 52 of the dielectric film 50 should be formed such that the inclined surfaces 52A and 52B have a slope angle θ and a height h (an amount of protrusion) of the protruding part 52 which are adequate to prevent the liquid crystal from giving rise to unoriented areas at the time of activation. In addition, the height h of the protruding part 52 should be small enough to permit the dielectric film 50 on the pixel electrode 44 to remain unchanged in thickness.

As mentioned above, according to the pixel structure of the present embodiment, the dielectric film 50 protrudes from the electrode surface in the area between the pixel electrodes 44. This pixel structure offers an advantage that the space between the pixel electrodes 44 does not become depressed when the silicon nitride undergoes etch back even though the gap between the pixel electrodes 44 is narrow (small). The result is that, when the alignment film 47 is formed on the dielectric film 50, the alignment film 47 is free from uncoated parts which occur in the case where the space between the pixel electrodes 44 takes on a depressed shape. The absence of such uncoated parts prevents the occurrence of areas where liquid crystal remains unoriented at the time of activation. This, in turn, prevents the occurrence of partial decrease in light reflectance.

Moreover, the protruding part 52 of the dielectric film 50 has the inclined surfaces 52A and 52B such that the lower ends of the inclined surfaces 52A and 52B are closer to the center O between the pixel electrodes 44 than to the edge surfaces of the pixel electrodes 44. This structure prevents the dielectric film 50 from changing in thickness at the edges of the pixel electrodes 44. The uniform film thickness prevents the light from undergoing irregular reflection at the edges of the pixel electrodes 44, thereby preventing the decrease in reflectance. The foregoing effect protects the image from looking rough as the result of individual pixels 40 varying in light reflectance.

In other words, the pixel structure according to the present embodiment protects the image quality from deteriorating due to the depressed space between the pixel electrodes 44 even though the gap between the pixel electrodes 44 is decreased. This makes it possible to intentionally reduce the gap between the pixel electrodes 44. The reduction of the gap between the pixel electrodes 44 (the width of the space between the pixel electrodes 44) increases the area of the pixel electrode 44 in proportion to the reduced gap, and this permits the pixel electrode 44 to increase in reflectance. The result is the high quality display image, which contributes to the improvement in display quality of the liquid crystal display device 10.

[Method for Production]

Figure 6:
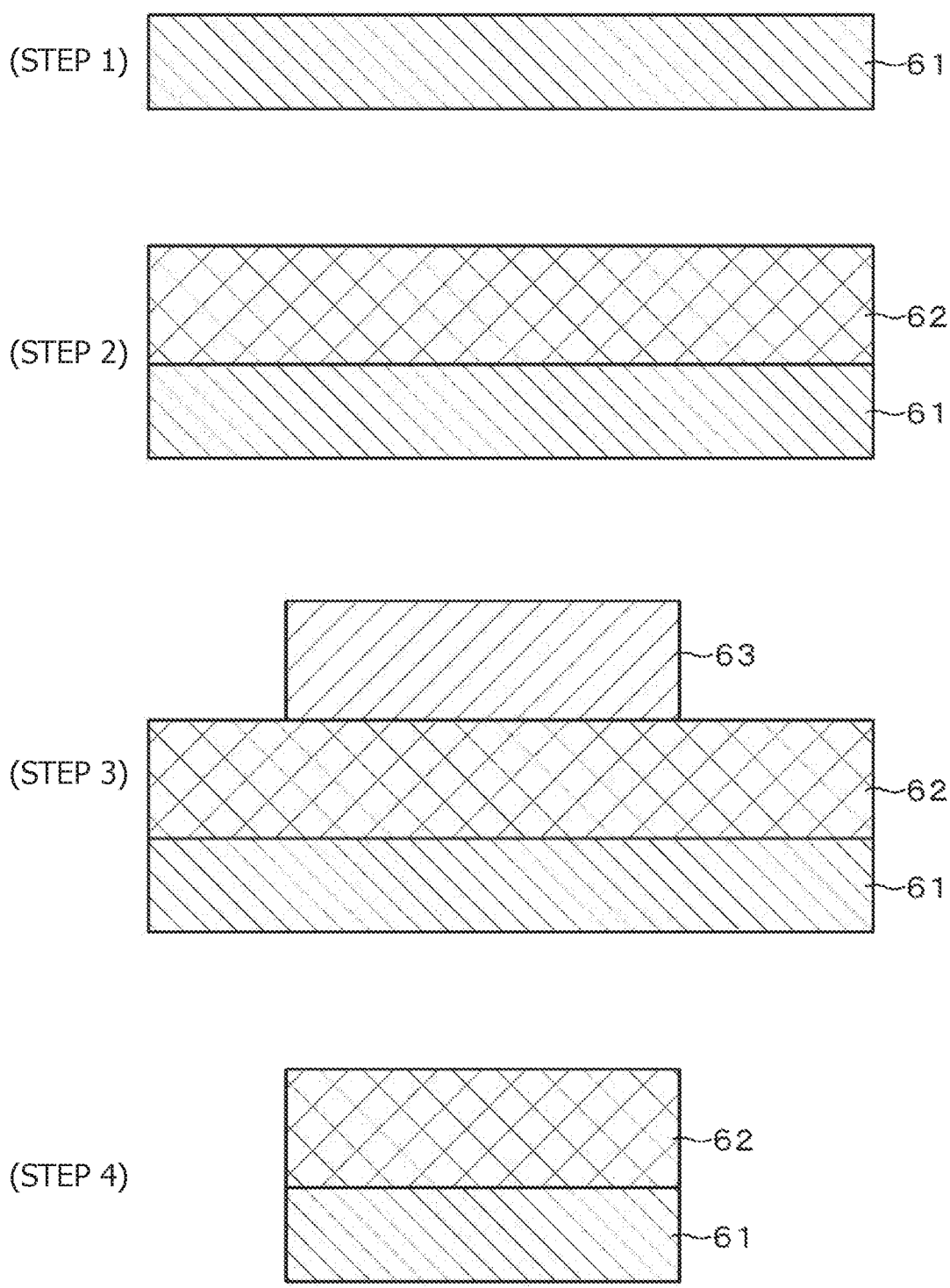
FIG. 6 is a schematic diagram (Part 1) depicting a process for producing the pixel structure according to the present embodiment.

The pixel structure according to the present embodiment or the display device according to the present disclosure is produced as depicted in FIGS. 6 (Part 1), 7 (Part 2), and 8 (Part 3).

The first step for production is to form an aluminum (Al) electrode 61 from Al or the like by sputtering as a material for the pixel electrode 44 (Step 1 in FIG. 6). The second step is to coat the Al electrode 61 with a plasma silicon nitride film (P—SiN) 62 as a sacrificial layer (Step 2 in FIG. 6). The third step is the lithography step which includes coating with a resist 63 and patterning by sensitization (Step 3 in FIG. 6). The fourth step is dry etching to be performed on the plasma silicon nitride film 62 and the Al electrode 61 altogether (Step 4 in FIG. 6).

Figure 7:
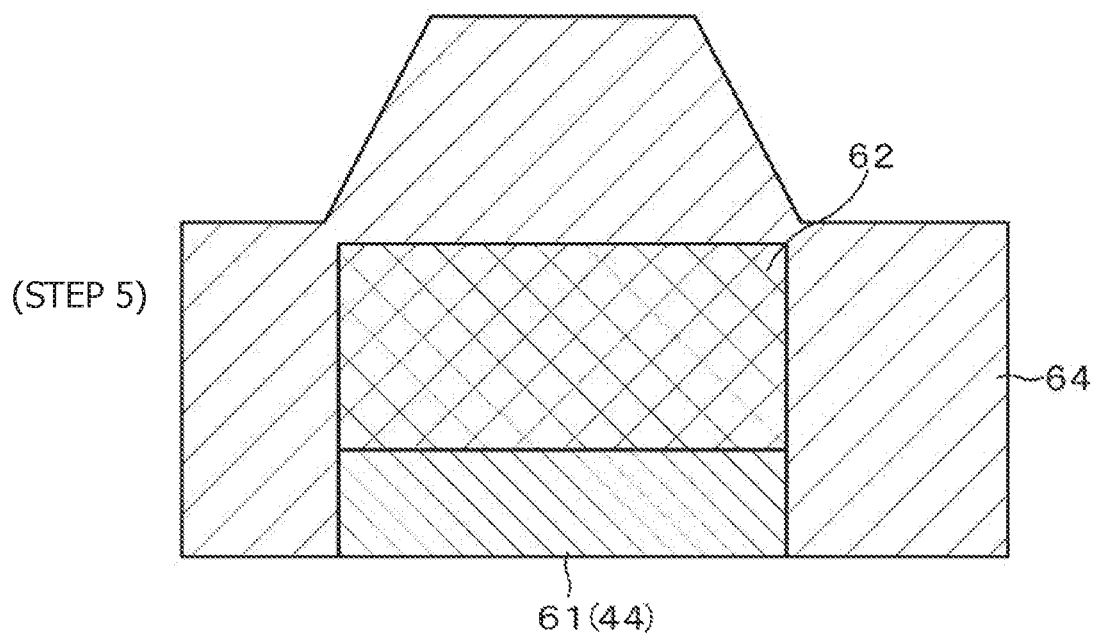
FIG. 7 is a schematic diagram (Part 2) depicting the process for producing the pixel structure according to the present embodiment.
Figure 7:
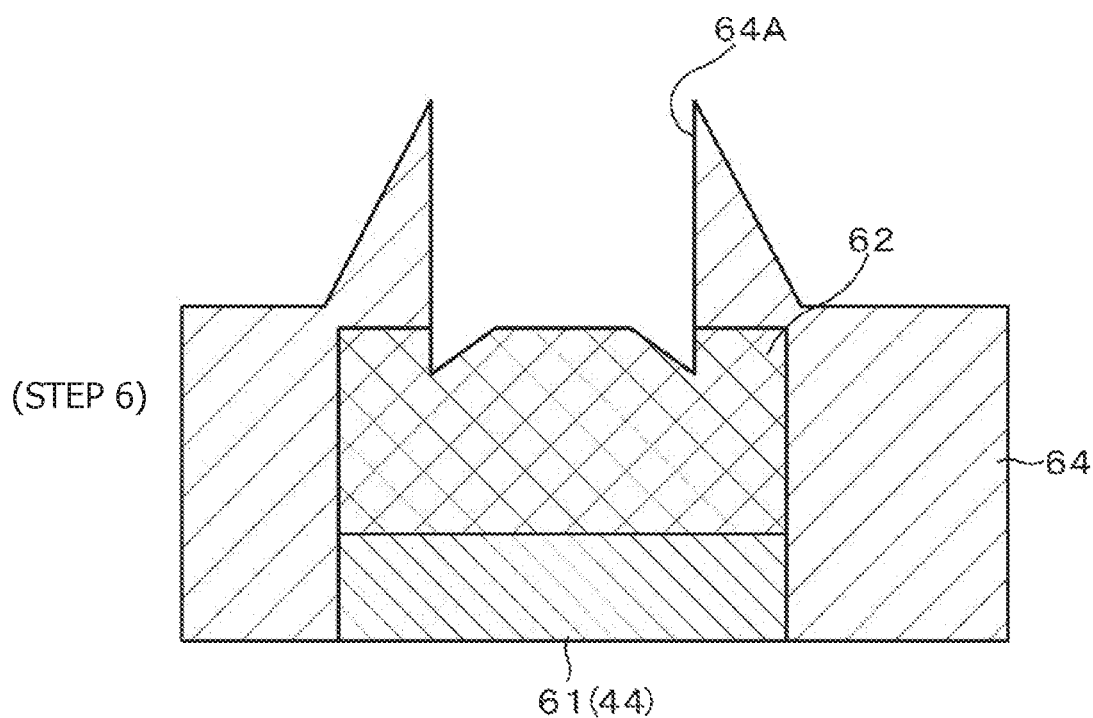

The fifth step is to form a silicon oxide (SiO) film 64 as the interlayer film 49 (Step 5 in FIG. 7). The sixth step is to form a cavity 64A in the silicon oxide film 64 by inverted mask process, the cavity 64 being above the center of the plasma silicon nitride film 62 (Step 6 in FIG. 7). The seventh step is to planarize the silicon oxide film 64 by chemical mechanical polishing (CMP) or the like (Step 7 in FIG. 8). Incidentally, the sacrificial film to be formed on the Al electrode 61 is not necessarily restricted to the silicon nitride film 62; it may be any one which has an adequate selective ratio in comparison with the silicon oxide film 64 at the time of polishing.

Figure 8:
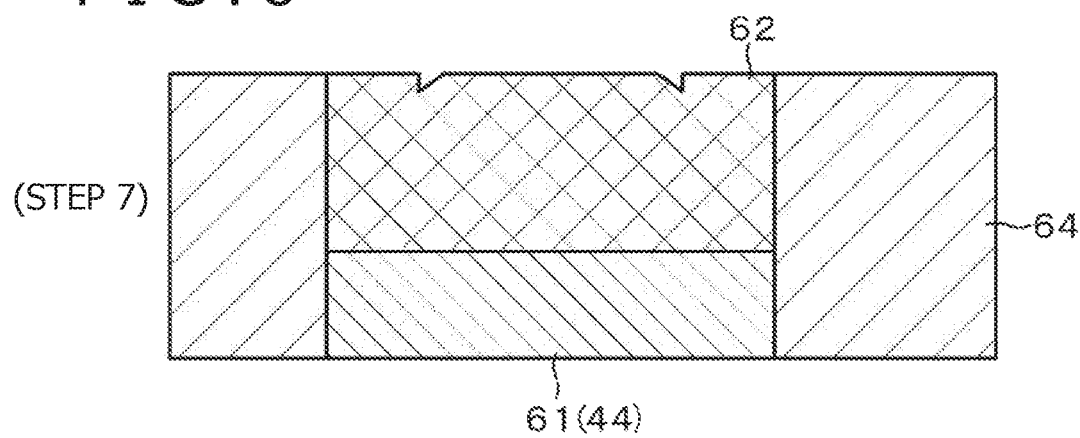
FIG. 8 is a schematic diagram (Part 3) depicting the process for producing the pixel structure according to the present embodiment.
Figure 8:
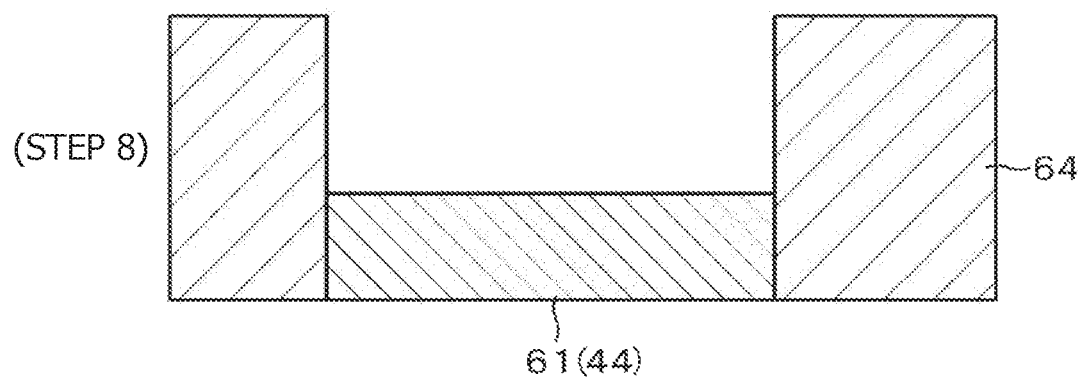
Figure 8:
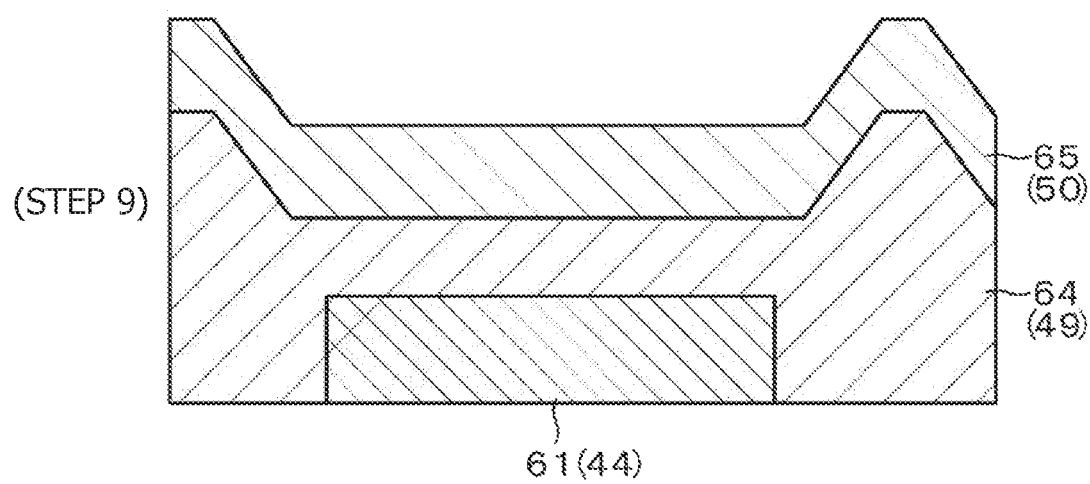

The eighth step is to remove the silicon nitride film 62 as the sacrificial film (Step 8 in FIG. 8). The removal of the silicon nitride film 62 leaves the silicon oxide film 64 as the interlayer film 49 in protruding form between the Al electrodes 61, or between the pixel electrodes 44. The ninth step is to coat the silicon oxide film 64 remaining in protruding form with a dielectric film 65 (corresponding to the dielectric film 50 depicted in FIG. 5A) by high-density plasma (HDP) (Step 9 in FIG. 8).

Owing to the high-density plasma used to form the dielectric film 65, the protruding silicon oxide film 64 remaining between the Al electrodes 61 has its corners rounded by sputtering components. This step provides the silicon oxide film 64 as the interlayer film 49 with the inclined surfaces. The consequence of this step is that the dielectric film 65 is formed with the inclined surfaces, which are identified as the inclined surfaces 52A and 52B of the protruding part 52 of the dielectric film 50 as depicted in FIG. 5A.

Although the process explained above employs high-density plasma to form the dielectric film 65, thereby forming the inclined surface on the silicon oxide film 64, the use of high-density plasma may be replaced by reverse sputtering or the like to form the inclined surface on the silicon oxide film 64. In addition, before the dielectric film 65 is formed, the silicon oxide film 64 should be provided with the inclined surface having an adequate height which does not change the film thickness above the edge of the Al electrode 61 when the dielectric film 65 is formed. This permits the pixel electrode 44 to have the high reflectance.

The series of Steps 1 to 9 mentioned above permit the production of the pixel structure pertaining to the present embodiment, in which the dielectric film 50 as an example of the insulating film has a part protruding from the electrode surface between the pixel electrodes 44 and also the protruding part 52 of the dielectric film 50 has the inclined surfaces 52A and 52B.

Incidentally, the embodiment mentioned above is concerned with the liquid crystal display device of reflection type in which the pixel electrode 44 functions as the reflective electrode. The technology of the present disclosure is not restricted to the liquid crystal display device of reflection type, but it may be applied to the liquid crystal display device of transmission type in which the pixel electrode 44 is a transmission electrode. As in the former case, the latter case is also liable to the deterioration in image quality due to the depression of the space between the pixel electrodes 44.

<Display Apparatus of Projection Type>

The liquid crystal display device according to the embodiment mentioned above may be used as a liquid crystal light valve which functions as a light modulator in the display apparatus of projection type. The display apparatus of projection type which employs the liquid crystal display device (liquid crystal panel) as the liquid crystal light valve falls under two categories: that of three-panel type and that of single-panel type. These two types are constructed as outlined in the following.

[Three-Panel Liquid Crystal Display Apparatus of Projection Type]

Figure 9:
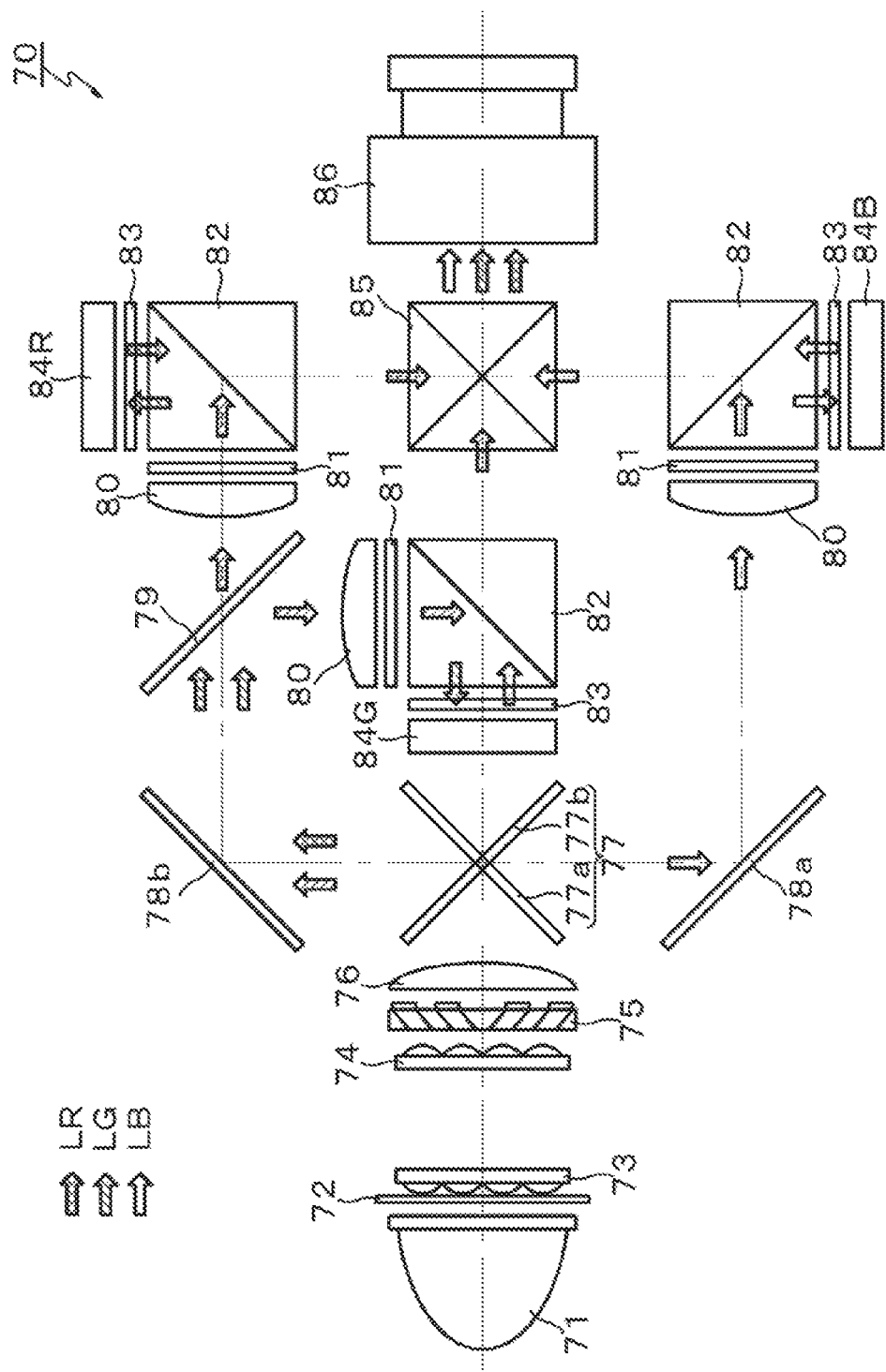
FIG. 9 is a schematic diagram depicting one example of a structure of an optical system employed in a three-panel liquid crystal display apparatus of projection type.

FIG. 9 is a schematic diagram depicting one example of a structure of an optical system employed in the three-panel liquid crystal display apparatus of projection type. A three-panel liquid crystal display apparatus of projection type 70 according to the present example includes a light source 71, an ultraviolet (UV) and/or infrared (IR) cut filter 72, a first fly eye lens 73, a second fly eye lens 74, a PS synthesizing element 75, a condenser lens 76, and a cross dichroic mirror 77 as depicted in FIG. 9.

The light source 71 emits white light including red light, green light, and blue light which are necessary for color image display. The light emitted from the light source 71 is approximately parallel light, which passes through the UV/IR cut filter 72 and enters the first fly eye lens 73. The first and second fly eye lenses 73 and 74 face each other, and each of them includes a plurality of microlenses which are two-dimensionally arranged. They function to even out the irradiance distribution of the light entering from the light source 71.

The PS synthesizing element 75 functions to separate the incident light into two polarized components of P-polarized component and S-polarized component. The light emanating from the PS synthesizing element 75 is condensed by the condenser lens 76 and then enters the cross dichroic mirror 77. The cross dichroic mirror 77 includes a dichroic mirror 77a and a dichroic mirror 77b. The former passes the red light LR and green light LG and reflects the blue light LB which are contained in the light condensed by the condenser lens 76. The latter passes the blue light LB and reflects the red light LR and green light LG which are contained in the light condensed by the condenser lens 76. These two dichroic mirrors 77a and 77b join together at a cross angle of 90 degrees.

The liquid crystal display apparatus of projection type 70 has a mirror 78a, a field lens 80, a trimming filter 81, and a polarized light beam splitter 82, which are arranged along an optical path for the blue light LB separated by the cross dichroic mirror 77. The mirror 78a reflects the blue light LB, which has been separated by the cross dichroic mirror 77, toward the polarized light beam splitter 82. The polarized light beam splitter 82 passes one of the polarized components (S-polarized component in this case) and reflects the other of the polarized components (P-polarized component in this case). Since the light emanating from the PS synthesizing element 75 is polarized light of the P-polarized component, the blue light LB reflected by the mirror 78a is reflected by the polarized light beam splitter 82 and introduced into a liquid crystal display device of reflection type 84B through a quarter wave plate 83.

Upon reception of image signals of the blue light LB through the quarter wave plate 83 from the polarized light beam splitter 92, the liquid crystal display device of reflection type 84B controls the light transmittance of the pixels which are two-dimensionally distributed, thereby producing the blue image light. In other words, the liquid crystal display device of reflection type 84B functions as the light modulator which three-dimensionally modulates the blue light LB entering through the quarter wave plate 83, in response to the image signals (or image data) which are input from a control unit not depicted. Further, the liquid crystal display device of reflection type 84B functions as the liquid crystal display device that performs light modulation on the blue light LB.

The quarter wave plate 83 functions to displace the phase of the incident light by a quarter of the wavelength. The blue light LB passes through the quarter wave plate 83 twice before entrance into and after reflection from the liquid crystal display device of reflection type 84B. In other words, the blue light LB which has undergone light modulation changes into light which has its phase displaced by a half (=quarter plus quarter) the original phase before light modulation. The blue light LB, which is one polarized component (P-polarized component in this case) before light modulation, is converted into the other polarized component (S-polarized component in this case) after it has passed through the quarter wave plate 83 twice. Consequently, the blue light LB before light modulation is reflected by the polarized light beam splitter 82, but the blue light LB after light modulation passes through the polarized light beam splitter 82 and enters a cross prism 85.

The liquid crystal display apparatus of projection type 70 has a mirror 78b and a dichroic mirror 79, which are arranged along an optical path for the red light LR and green light LG separated by the cross dichroic mirror 77. The mirror 78b reflects the red light LR and the green light LG, which have been separated by the cross dichroic mirror 77, toward the dichroic mirror 79. The dichroic mirror 79, for example, reflects the green light LG and passes the red light LR of the incident lights, thereby separating the incident light into the red light LR and the green light LG.

The liquid crystal display apparatus of projection type 70 has the field lens 80, the trimming filter 81, and the polarized light beam splitter 82, which are arranged along the optical path for the green light LG separated by the dichroic mirror 79. The polarized light beam splitter 82 passes one polarized component (S-polarized component in this case) and reflects the other polarized component (P-polarized component in this case) of two polarized components. Since the light emanating from the PS synthesizing element 75 is P-polarized light, the green light LG is reflected by the polarized light beam splitter 82 and introduced into a liquid crystal display device of reflection type 84G through the quarter wave plate 83.

Upon reception of image signals of the green light LG through the quarter wave plate 83 from the polarized light beam splitter 82, the liquid crystal display device of reflection type 84G controls the light transmittance of the pixels which are two-dimensionally distributed, thereby producing the green image light. In other words, the liquid crystal display device of reflection type 84G functions as the light modulator which three-dimensionally modulates the green light LG entering through the quarter wave plate 83, in response to the image signals (or image data) which are input from the control unit not depicted. Further, the liquid crystal display device of reflection type 84G functions as the liquid crystal display device that performs light modulation on the green light LG.

The liquid crystal display apparatus of projection type 70 has the quarter wave plate 83 between the polarized light beam splitter 92 and the liquid crystal display device of reflection type 84G. Therefore, the green light LG, which is one polarized component (P-polarized component in this case) before light modulation, passes through the quarter wave plate 83 twice, so that it is converted into the other polarized component (S-polarized component in this case). The green light LG before light modulation is reflected by the polarized light beam splitter 82, but after light modulation, it passes through the polarized light beam splitter 82 to enter the cross prism 85.

The liquid crystal display apparatus of projection type 70 has the field lens 80, the trimming filter 81, and the polarized light beam splitter 82, which are arranged along the optical path for the red light LR separated by the dichroic mirror 79. The polarized light beam splitter 82 passes one polarized component (S-polarized component in this case) and reflects the other polarized component (P-polarized component in this case) of two polarized components. Since the light emanating from the PS synthesizing element 75 is the polarized component of P-polarized light, the red light LR is reflected by the polarized light beam splitter 82 and introduced into a liquid crystal display device of reflection type 84R through the quarter wave plate 83.

Upon reception of image signals of the red light LR through the quarter wave plate 83 from the polarized light beam splitter 82, the liquid crystal display device of reflection type 84R controls the light transmittance of the pixels which are two-dimensionally distributed, thereby producing the red image light. In other words, the liquid crystal display device of reflection type 84R functions as the light modulator which three-dimensionally modulates the red light LR entering through the quarter wave plate 83, in response to the image signals (or image data) which are input from the control unit not depicted. Further, the liquid crystal display device of reflection type 84R functions as the liquid crystal display device that performs light modulation on the red light LR.

The liquid crystal display apparatus of projection type 70 has the quarter wave plate 83 between the polarized light beam splitter 82 and the liquid crystal display device of reflection type 84R. Therefore, the red light LR, which is one polarized component (P-polarized component in this case) before light modulation, passes through the quarter wave plate 83 twice, so that it is converted into the other polarized component (S-polarized component in this case). The red light LR before light modulation is reflected by the polarized light beam splitter 82, but after light modulation, it passes through the polarized light beam splitter 82 to enter the cross prism 85.

The liquid crystal display apparatus of projection type 70 has the cross prism 85 at the position where the optical paths of the red light LR, the green light LG, and the blue light LB intersect one another. The cross prism 85 functions to synthesize the light of three colors including three colors (red light LR, green light LG, and blue light LB). The cross prism 85 emanates the light synthesized from red light LR, green light LG, and blue light LB toward a projection lens 86 which constitutes a projector. The projection lens 86 enlarges the synthesized light emanating from the cross prism 85 and projects the enlarged image toward a screen not depicted.

Incidentally, the three-panel liquid crystal display apparatus of projection type 70 which is constructed as mentioned above may employ the liquid crystal display device of reflection type pertaining to the embodiment mentioned above as the liquid crystal display device of reflection type for red color 84R, the liquid crystal display device of reflection type for green color 84G, and the liquid crystal display device of reflection type for blue color 84B. The liquid crystal display device of reflection type pertaining to the embodiment mentioned above has an advantage that it has the gap between pixel electrodes narrowed down. The narrow gap permits the area of the pixel electrode to increase, which, in turn, permits the pixel electrode to improve in reflectance. Consequently, the three-panel liquid crystal display apparatus of projection type 70, which employs, as the liquid crystal light valve, the liquid crystal display device of reflection type pertaining to the embodiment mentioned above produces high-quality display images. Thus it permits the three-panel liquid crystal display apparatus of projection type 70 to improve in display quality.
[Single-Panel Liquid Crystal Display Apparatus of Projection Type]

Figure 10:
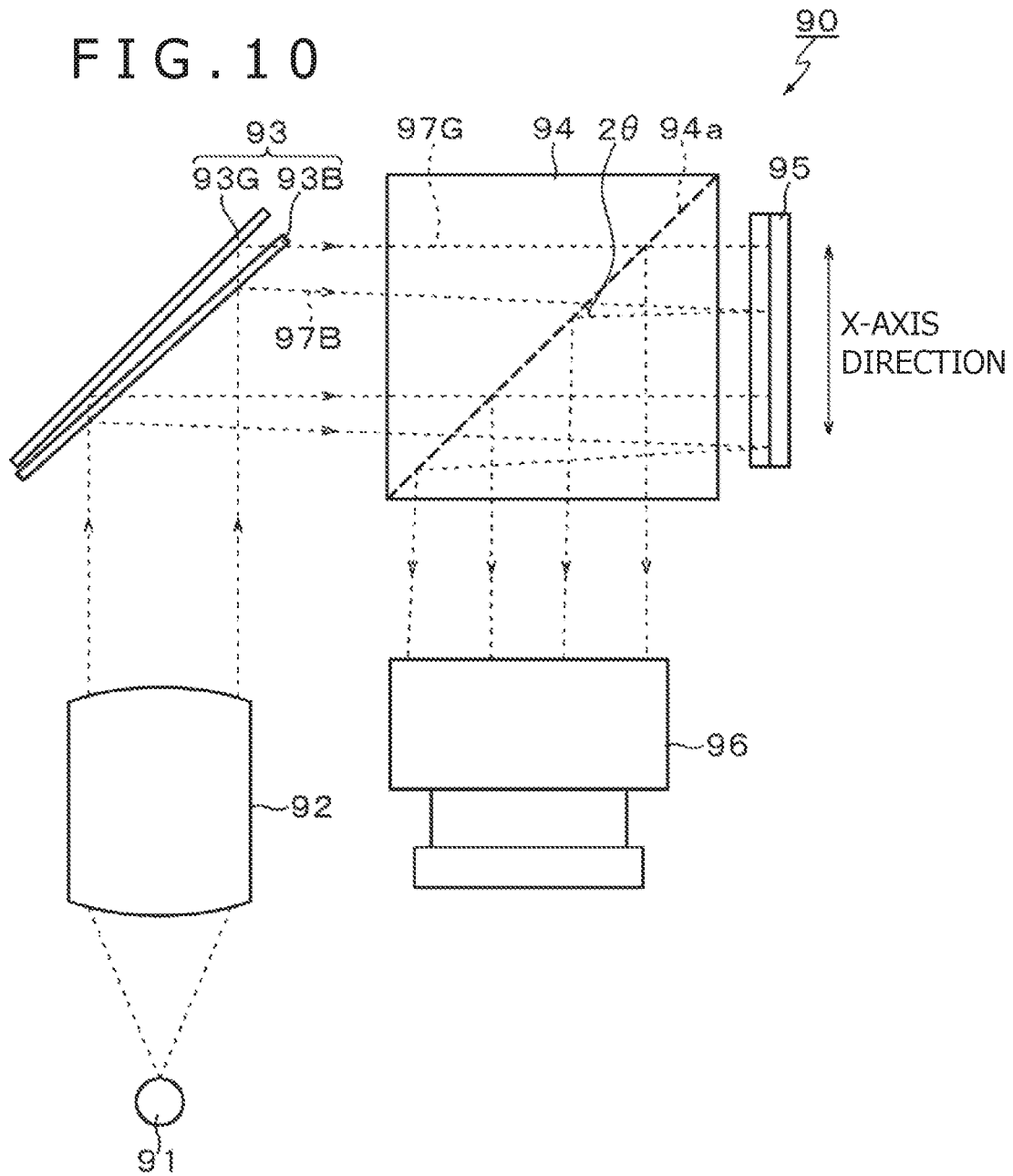
FIG. 10 is a schematic diagram depicting one example of a structure of an optical system employed in a single-panel liquid crystal display apparatus of projection type.

FIG. 10 is a schematic diagram depicting one example of a structure of an optical system employed in the single-panel liquid crystal display apparatus of projection type. A single-panel liquid crystal display apparatus of projection type 90 according to the present example includes a light source 91, a collimator lens 92, a dichroic mirror 93, a polarized light beam splitter 94, a liquid crystal display device of reflection type 95, and a projection lens 96, as depicted in FIG. 10.

The light source 91 emanates white light including red light, green light, and blue light necessary for color image display. The collimator lens 92 converts the white light emanating from the light source 91 into parallel light. The dichroic mirror 93 separates the white parallel light emanating from the collimator lens 92 into three primary colors (red, green, and blue). The polarized light beam splitter 94 passes only the P-polarized component of the incident light and reflects the S-polarized component of the incident light.

The liquid crystal display device of reflection type 95 performs selective modulation on each incident color light which has passed through the polarized light beam splitter 94 and then reflects the modulated light. The projection lens 96 collects the S-polarized component of each color reflected by the polarized light beam splitter 94 from the light reflected by the liquid crystal display device of reflection type 95 to synthesize them, enlarges the synthesized light, and projects the enlarged image toward the screen not depicted.

The P-polarized component is defined as the linearly polarized light in which the light incident on a polarized light separating plane 94a of the polarized light beam splitter 94 has an electric vector whose vibration direction is contained in an incident plane (which contains both the normal line of the polarized light separating plane 94a and the normal line of wave surface (or the light traveling direction)). Also, the S-polarized component is defined as the linearly polarized light in which the light incident on the polarized light separating plane 94a of the polarized light beam splitter 94 has an electric vector whose vibration direction intersects at right angles with the incident plane.

Incidentally, FIG. 10 for the dichroic mirror 93 only illustrates dichroic mirrors 93G and 93B for separation of G light and B light and does not illustrate the dichroic mirror for separation of R light. The dichroic mirror 93B for separation of B light is arranged such that it inclines (in a direction parallel to a paper plane) a very small angle (here, θ/2) relative to the dichroic mirror 93G for separation of G light. The dichroic mirror not depicted for separation of R light is arranged such that it inclines (in a direction perpendicular to the paper plane) a very small angle (here, θ/2) relative to the dichroic mirror 93G.

The single-panel liquid crystal display apparatus of projection type 90 which is constructed as mentioned above works in such a way that the white light emanating from the light source 91 is separated into three primary colors (R light, G light, and B light) by the dichroic mirror 93 (only G light 97G and B light 97B are depicted here). The thus separated colors are reflected in mutually different directions. The B light and R light each intersect the G light at an angle of θ respectively in the X-axis direction and the Y-axis direction perpendicular to the X-axis direction. The light including three primary colors passes through the polarized light beam splitter 94 to become the light having only the P-polarized component and then enters the liquid crystal display device of reflection type 95.

The light traveling in the X-axis direction is explained below. The parallel G light perpendicularly incident on the liquid crystal display device of reflection type 95 is reflected at normal angle. The reflected light (parallel light) enters the polarized light beam splitter 94 along the optical path through which it has come. The beam splitter selectively reflects only the S-polarized component in the perpendicular direction. On the other hand, the parallel B light which is incident at an angle of θ on the liquid crystal display device of reflection type 95 is reflected at an angle of θ and emanated in the form of parallel light. Consequently, the incident light and the reflected light make an angle of 2θ. The reflected B light has only the S-polarized component selectively reflected by the polarized light beam splitter 94, and the reflected light travels in a direction at an angle of θ with respect to the direction of reflection of G light in the paper plane. The same as above is applied to R light, although no illustration is given. The R light is reflected at an angle of θ in the direction of Y axis by the liquid crystal display device of reflection type 95. Then it has only the S-polarized component selectively reflected by the polarized light beam splitter 94. The reflected light travels in a direction at an angle of θ with respect to the direction of reflection of G light in the paper plane.

The single-panel liquid crystal display apparatus of projection type 90 which is constructed as mentioned above may employ the liquid crystal display device of reflection type pertaining to the embodiment mentioned above as the liquid crystal display device of reflection type 95. The liquid crystal display device of reflection type pertaining to the embodiment mentioned above has the advantage that it has the gap between pixel electrodes narrowed down. The narrow gap permits the area of the pixel electrode to increase, which, in turn, permits the pixel electrode to improve in reflectance. Consequently, the single-panel liquid crystal display apparatus of projection type 90, which employs, as the liquid crystal light valve, the liquid crystal display device of reflection type pertaining to the embodiment mentioned above produces high-quality display images. Thus it permits the single-panel liquid crystal display apparatus of projection type 90 to improve in display quality.

In addition, the single-panel liquid crystal display apparatus of projection type 90 needs only one-third as many sets of liquid crystal display device of reflection type as the three-panel liquid crystal display apparatus of projection type 70, although the former gives one-third as much pixel information as the latter. This leads to the advantage of miniaturizing the optical system and reducing the production cost as compared with the three-panel liquid crystal display apparatus of projection type 70.

The embodiments of the present disclosure may be defined as follows.

[1] A display device including:
pixel electrodes formed for individual pixels; and
an insulating film for insulation between the pixel electrodes, in which
the insulating film is so formed as to protrude from an electrode surface between the pixel electrodes.

[2] The display device described in Paragraph [1] above, in which
the protruding part of the insulating film between the pixel electrodes has inclined surfaces extending from a center between the pixel electrodes to edges of the pixel electrodes.

[3] The display device described in Paragraph [2] above, in which the protruding part of the insulating film between the pixel electrodes is formed closer to the center of the pixel electrodes than to edge faces of the pixel electrodes.

[4] The display device described in any one of Paragraphs [1] to [3] above, in which the protruding part has a height which does not affect a thickness of the insulating film on the pixel electrode.

[5] The display device described in any one of Paragraphs [1] to [4] above, in which the insulating film is a dielectric film of silicon nitride.

[6] The display device described in any one of Paragraphs [1] to [5] above, in which the pixel electrodes include a reflecting electrode.

[7] A method for producing a display device including pixel electrodes formed for individual pixels and an insulating film for insulation between the pixel electrodes, the method including:

forming the insulating film so as to protrude from an electrode surface between the pixel electrodes.

[8] The method for producing a display device described in Paragraph [7] above, the method further including:

forming the protruding part of the insulating film between the pixel electrodes so as to incline in going from a center between the pixel electrodes to edges of the pixel electrodes.

[9] The method for producing a display device described in Paragraph [8] above, the method further including:

after remaining an interlayer film protruded between the pixel electrodes, forming the insulating film by using high-density plasma on the protruding interlayer film.

[10] A display apparatus of projection type including:

a light source;

a light modulator to modulate light from the light source; and a projector to project the light which has undergone modulation by the light modulator, in which the light modulator includes pixel electrodes formed for individual pixels, and an insulating film for insulation between the pixel electrodes, the insulating film being so formed as to protrude from an electrode surface between the pixel electrodes.

DESCRIPTION OF REFERENCE SYMBOLS

10 . . . Liquid crystal display device
11 . . . First substrate (silicon substrate)
12 . . . Second substrate (glass substrate)
20 . . . Display panel (liquid crystal panel)
21 . . . Pixel array
22 ($22_{-1}$ to $22_{-m}$) . . . Scanning line
23 ($23_{-1}$ to $23_{-m}$) . . . Signal line
24, 25 . . . Vertical driving part
26 . . . Horizontal driving part
30 . . . Display driving part
40 . . . Unit pixel
41 . . . Pixel transistor
42 . . . Liquid crystal capacity
43 . . . Storage capacity
44 . . . Pixel electrode
45 . . . Counter electrode
46 . . . Liquid crystal layer
47, 48 . . . Alignment film
49, 51 . . . Interlayer film
50, 65 . . . Dielectric film
52 . . . Protruding part of dielectric film 52A, 52B . . . Inclined surface of protruding part
70 . . . Three-panel liquid crystal display apparatus of projection type
84R . . . Liquid crystal display device of reflection type for red light
84G . . . Liquid crystal display device of reflection type for green light
84B . . . Liquid crystal display device of reflection type for blue light
90 . . . Single-panel liquid crystal display apparatus of projection type
95 . . . Liquid crystal display device of reflection type

[NAME OF DOCUMENT] DRAWINGS

[FIG. 1]
1-1: Input of image data
30: Display driving part
26: Horizontal driving part
24, 25: Vertical driving part
40: Pixel
[FIG. 2B]
2-1: First frame
2-2: Second frame
2-3: Third frame
[FIG. 4A]
4-1: Void area in alignment film between pixel electrodes
4-2: Occurrence of incomplete orientation
[FIG. 4B]
4-3: Irregular reflection
4-4: Originally regular reflection
4-5: Edge of pixel electrode
[FIG. 4C]
4-6: Dark pixel
4-7: Decreased reflectance
4-8: Bright pixel
[FIG. 6]
6-1: Step 1
6-2: Step 2
6-3: Step 3
6-4: Step 4
[FIG. 7]
7-1: Step 5
7-2: Step 6
[FIG. 8]
8-1: Step 7
8-2: Step 8
8-3: Step 9
[FIG. 10]
10-1: X-axis direction

The invention claimed is:
1. A display device, comprising:
a plurality of pixels;
a plurality of pixel electrodes for corresponding pixels of the plurality of pixels;
a counter electrode opposite to a pixel electrode of the plurality of pixel electrodes; and
an insulating film for insulation between the plurality of pixel electrodes, wherein
the insulating film is between the pixel electrode and the counter electrode,
the insulating film protrudes from an electrode surface in a first region between the plurality of pixel electrodes,
a protruding part of the insulating film between the plurality of pixel electrodes has inclined surfaces inclined at an angle from a center between the plurality of pixel electrodes to edges of the plurality of pixel electrodes, lower ends of the inclined surfaces are spaced apart from the edges of the plurality of pixel electrodes by a distance, such that the protruding part is in a non-overlapping manner with the plurality of pixel electrodes, and the lower ends of the inclined surfaces are closer to the center than the edges of the plurality of pixel electrodes.

2. The display device according to claim 1, wherein the protruding part of the insulating film is closer to the center between the plurality of pixel electrodes than to edge faces of the plurality of pixel electrodes.

3. The display device according to claim 1, wherein the protruding part has a height such that a thickness of a portion of the insulating film is uniform, and the portion of the insulating film is on the plurality of pixel electrodes.

4. The display device according to claim 1, wherein the insulating film is a dielectric film of silicon nitride.

5. The display device according to claim 1, wherein each pixel electrode of the plurality of pixel electrodes is a reflecting electrode.

6. A method for producing a display device, the method comprising:

forming an insulating film as to protrude from an electrode surface between a plurality of pixel electrodes, wherein the plurality of pixel electrodes is associated with corresponding pixels of a plurality of pixels, the insulating film is for insulation between the plurality of pixel electrodes, the insulating film is between a pixel electrode of the plurality of pixel electrodes and a counter electrode, a protruding part of the insulating film between the plurality of pixel electrodes has inclined surfaces inclined at an angle from a center between the plurality of pixel electrodes to edges of the plurality of pixel electrodes, lower ends of the inclined surfaces are spaced apart from the edges of the plurality of pixel electrodes by a distance, such that the protruding part is in a non-overlapping manner with the plurality of pixel electrodes, and the lower ends of the inclined surfaces are closer to the center than the edges of the plurality of pixel electrodes.

7. The method according to claim 6, further comprising forming the insulating film by high-density plasma on a protruding interlayer film, wherein the protruding interlayer film is protruded between the plurality of pixel electrodes.

8. A display apparatus of projection type, the display apparatus comprising:

a light source;

a light modulator to modulate light from the light source; and a projector to project the modulated light, wherein the light modulator includes a display device, the display device includes:

a plurality of pixels;

a plurality of pixel electrodes for corresponding pixels of the plurality of pixels;

a counter electrode opposite to a pixel electrode of the plurality of pixel electrodes; and an insulating film for insulation between the plurality of pixel electrodes, wherein the insulating film is between the pixel electrode and the counter electrode, the insulating film protrudes from an electrode surface between the plurality of pixel electrodes, a protruding part of the insulating film between the plurality of pixel electrodes has inclined surfaces inclined at an angle from a center between the plurality of pixel electrodes to edges of the plurality of pixel electrodes, lower ends of the inclined surfaces are spaced apart from the edges of the plurality of pixel electrodes by a distance, such that the protruding part is in a non-overlapping manner with the plurality of pixel electrodes, and the lower ends of the inclined surfaces are closer to the center than the edges of the plurality of pixel electrodes.

9. The display device according to claim 1, further comprising a first interlayer film between the plurality of pixel electrodes and the insulating film.

10. The display device according to claim 9, further comprising a second interlayer film between the insulating film and the counter electrode.

11. The display device according to claim 1, wherein a thickness of the insulating film in a second region on the pixel electrode is unchanged.

* * * * *